(12) United States Patent
Tang

(10) Patent No.: US 6,277,471 B1
(45) Date of Patent: Aug. 21, 2001

(54) BRIGHTNESS ENHANCEMENT FILM

(76) Inventor: Shih Chieh Tang, No. 206, Lane 167, Pen-Yaun 1st Sec. An-Nan Dist., Tainan (TW)

(*) Notice: Subject to any disclaimer, the term of this patent is extended or adjusted under 35 U.S.C. 154(b) by 0 days.

(21) Appl. No.: 09/335,487

(22) Filed: Jun. 18, 1999

(51) Int. Cl.$^7$ .............................. B32B 3/00; G03B 21/60; G02F 1/00
(52) U.S. Cl. .......................... 428/172; 428/167; 428/913; 359/321; 359/454
(58) Field of Search ..................................... 428/167, 172, 428/141, 913; 359/530, 321, 454, 459

(56) References Cited

U.S. PATENT DOCUMENTS

| | | | |
|---|---|---|---|
| 5,229,882 | * | 7/1993 | Rowland .............................. 359/530 |
| 5,300,263 | * | 4/1994 | Hoopman et al. ..................... 264/2.5 |
| 5,462,700 | * | 10/1995 | Beeson et al. ....................... 264/1.27 |
| 5,831,766 | * | 11/1998 | Martin et al. ......................... 359/530 |
| 6,178,224 | * | 1/2001 | Polichar et al. .................... 378/98.2 |

FOREIGN PATENT DOCUMENTS

WO 96/23649   8/1996  (WO).

* cited by examiner

*Primary Examiner*—Donald J. Loney
(74) *Attorney, Agent, or Firm*—Bacon & Thomas

(57) ABSTRACT

A brightness enhancement film essentially comprises a base and a brightness layer. A brightness layer is molded to create a plurality of prisms in the molding process. Then the brightness layer is adhesively attached to the top surface of the base before the curing process so as to form the brightness enhancement film. Therefore, the top surface of the brightness layer and the bottom surface of the base respectively define the top surface and the bottom surface of the brightness enhancement film.

3 Claims, 2 Drawing Sheets

US 6,277,471 B1

BRIGHTNESS ENHANCEMENT FILM

BACKGROUND OF THE INVENTION

1. Field of the Invention

The present invention relates generally to a brightness enhancement film, and more particularly, relates to the brightness used in a backlit liquid crystal display.

2. Description of the Related Art

A backlit liquid crystal display generally includes a brightness enhancement film which is typically positioned between a diffuser and a liquid crystal display panel. The backlit liquid crystal display also includes a light source such as a fluorescent lamp, a light guide for transporting light for reflection toward the liquid crystal display panel, and white reflector for reflecting light toward the liquid crystal display panel. The brightness enhancement film collimates light emitted from the light guide thereby increasing the brightness of the liquid crystal display panel. The increased brightness enables a sharper image to be produced by the liquid crystal display panel and allows the power of the light source to be reduced to produce a selected brightness. The brightness enhancement film in the backlit liquid crystal display is useful in equipment such as computers, personal TVs, video recorders, mobile communication devices, and automobile and avionics instrument displays.

As shown in FIG. 1, International Publication No. WO96/23649, public on Aug. 8, 1996, discloses prevention of groove tip deformation in brightness enhancement film. A brightness enhancement film includes a base 101 having a first surface on which prisms 102 are formed by molding and a second surface that is substantially flat or planar and opposite the first surface. After molding, the brightness enhancement film 100 is cured so that it forms the prisms 102. This is followed by heat treating the prisms 102. Heat treating is performed at a temperature that is at least equal to a normal glass transition temperature of resin. Heat treating raises the glass transition temperature of the resulting polymer above approximately 333 K such that groove tip impression is reduced. The prisms 102 consist of a first facet 103 and a second facet 104 which are substantially flat or planar. A side-by-side arrangement of regular prisms 102 is preferred for optical performance in one direction because the facets of the prisms 102 refract in a single direction and can concentrate the light from the diffuser. However, one major drawback of WO96/23649 is that the prisms do not refract in two dimensions.

The present invention intends to provide a brightness enhancement film with prisms consisting of a brightness unit preferred for optical performance in two dimensions in such a way as to mitigate the above problem.

SUMMARY OF THE INVENTION

The primary objective of this invention is to provide a brightness enhancement film which includes prisms containing a plurality of brightness units preferred for optical performance in two dimensions.

The present invention is a brightness enhancement film. A brightness enhancement film essentially comprises a base and a brightness layer. A brightness layer is molded to create a plurality of prisms in molding process. And the brightness layer is adhesively attached to the top surface of the base before the curing process so as to form the brightness enhancement film. Therefore, the top surface of the brightness layer and the bottom surface of the base together define the top surface and the bottom surface of the brightness enhancement film. Light from the diffuser penetrates the base from the bottom surface to the top surface. After that light further penetrates the bottom surface of the brightness layer and is to be refracted by the top surface of the brightness layer thereby enhancing for optical performance in two dimensions.

Other objectives, advantages and novel features of the invention will become more apparent from the following detailed description and the accompanying drawings.

BRIEF DESCRIPTION OF THE DRAWINGS

The present invention will now be described in detail with reference to the accompanying drawings wherein.

DETAILED DESCRIPTION OF THE INVENTION

The brightness enhancement film of the present invention essentially comprises a base and a brightness layer. The brightness layer of the present invention mainly comprises a plurality of brightness units arranged in a parallel plane for optical performance in two dimensions. A preferred embodiment of the present invention aligns a plurality of prisms side by side in a parallel plane to form the brightness layer, and a plurality of brightness units are aligned adjacent to one another in a straight line to form the prism. A brightness layer is molded to create a plurality of prisms in the molding process. Before the curing process, the brightness layer is adhesively attached to the top surface of the base so as to form the brightness enhancement film. Therefore, the top surface of the brightness layer and the bottom surface of the base respectively define the top surface and the bottom surface of the brightness enhancement film.

Figure 2:
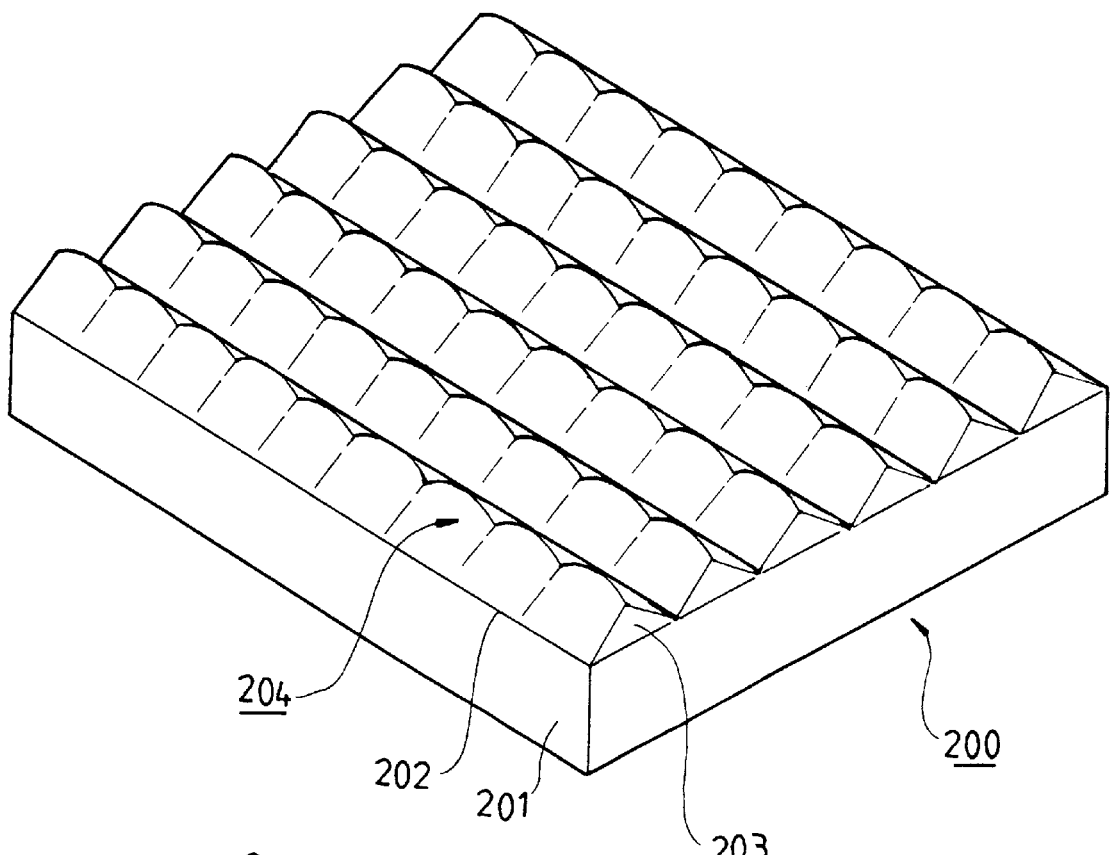
FIG. 2 is a perspective view of a brightness enhancement film of the embodiment in accordance with the present invention.
Figure 3:
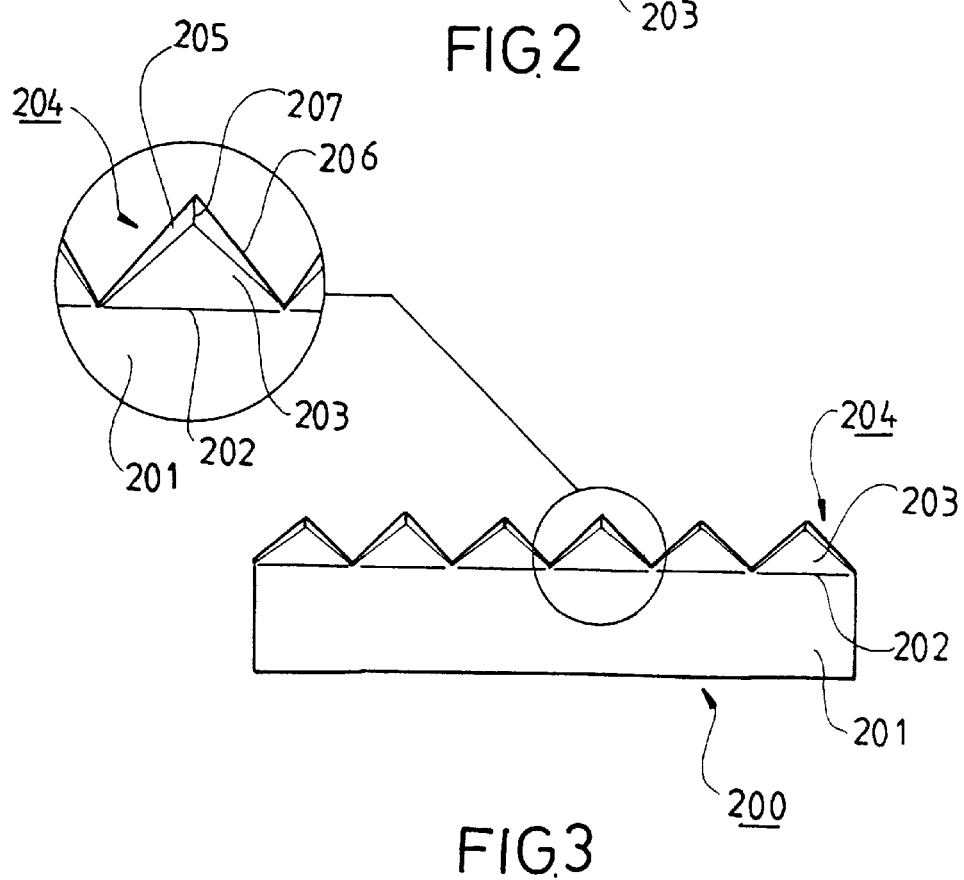
FIG. 3 is a side view of the brightness enhancement film of the embodiment in accordance with the present invention.

Referring to FIGS. 2 and 3, the brightness enhancement film 200 of the embodiment of the present invention essentially comprises a base 201 and a brightness layer 202. The brightness layer 202 is molded to create a plurality of prisms 203 in the molding process. Then brightness layer 202 is adhesively attached to the top surface of base 201 before the curing process so as to form the brightness enhancement film 200. Therefore, the top surface of brightness layer 202 and the bottom surface of base 201 respectively define the top surface and the bottom surface of the brightness enhancement film 200. The top surface of the brightness enhancement film 200 is irregular, the bottom surface is substantially flat or planar. A plurality of prisms 203 align side-by-side in a parallel plane to form the brightness layer 202, and a plurality of brightness units 204 are aligned adjacent to one another in a straight line to form the prism 203. Light from the diffuser penetrates the base 201 and brightness layer 202 thereby allowing optical performance in two dimensions. The brightness unit 204 substantially comprises a first curved facet 205 and a second curved facet 206 abutting each other to form the ridge 207 of brightness unit 204. Light penetrating the curved facet is refracted to a region thereby enhancing optical performance in two dimensions. The brightness layer 202 preferably is made of epoxy compound or the like.

Figure 1:
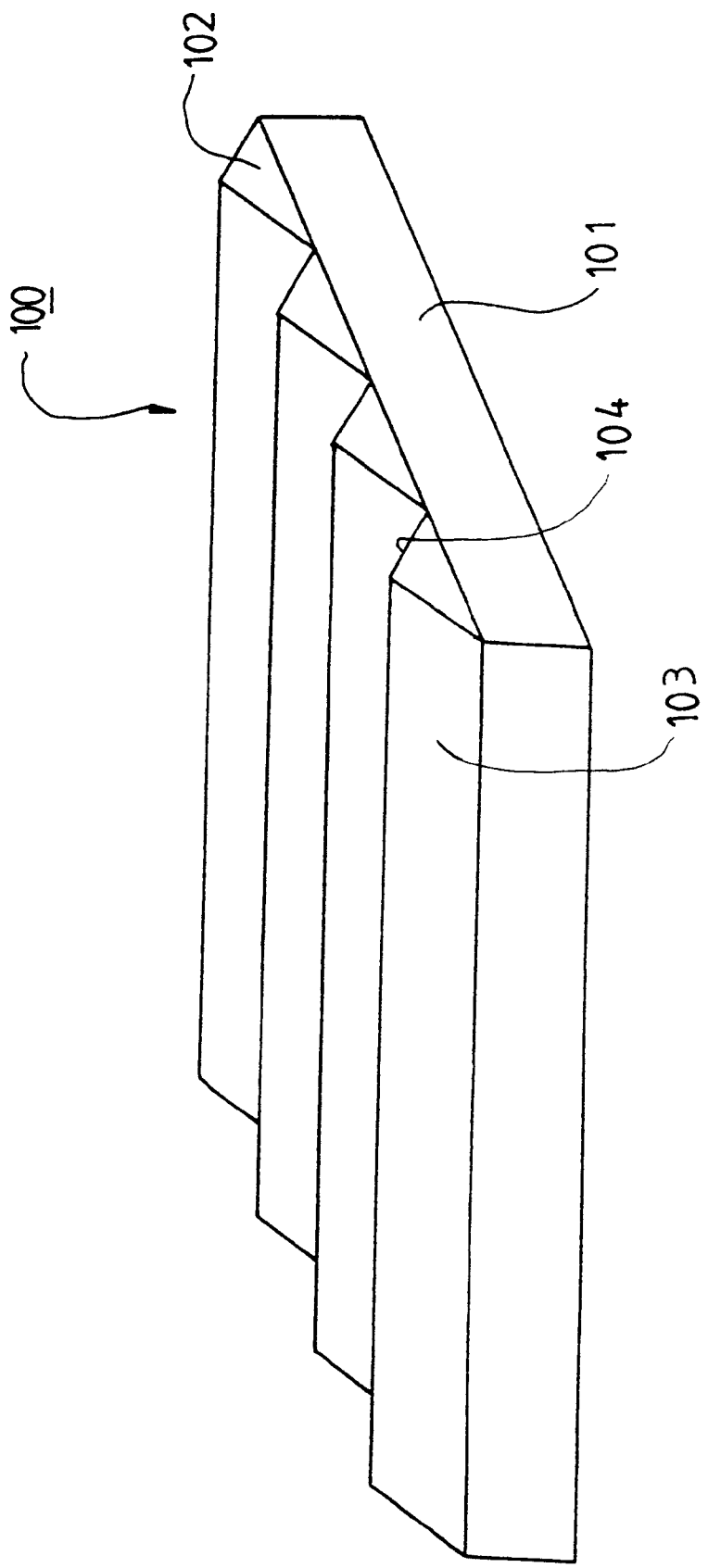
FIG. 1 is a perspective view of a brightness enhancement film in accordance with International Publication No. WO96/23649.

Referring to FIGS. 1 and 3, the prism 102 of WO96/23649 is comparable to prism 203 of the present invention. The first facet 103 and the second facet 104 of prism 102 are substantially flat or planar to refract light in a single direction in order to concentrate light from the diffuser to form a fence-like display on a liquid crystal display panel. The first curved facet 205 and the second curved facet 206 of the present invention refract light to a region that can concentrate light from the diffuser to form a uniform display on a liquid crystal display panel.

Although the invention has been described in detail with reference to its presently preferred embodiment, it will be understood by one of ordinary skill in the art that various modifications can be made without departing from the spirit and the scope of the invention, as set forth in the appended claims.

What is claimed is:

1. A brightness enhancement film comprising:

a base having a top surface and a bottom surface; and a brightness layer having a top surface which is defined by a plurality of brightness units and further having a bottom surface; said top surface defined by a plurality of brightness units being configured for enhanced optical performance in two dimensions to form a uniform display;

wherein the bottom surface of the brightness layer is adhesively attached to the top surface of the base to form the brightness enhancement film.

2. The brightness enhancement film, as defined in claim 1, wherein the brightness units are aligned adjacent to one another to form a prisms and a plurality of prisms are aligned side-by-side in a parallel plane to form the brightness layer.

3. The brightness enhancement film, as defined in claim 1, wherein the brightness layer is made of epoxy compound.

* * * * *